United States Patent [19]

Mukai et al.

[11] Patent Number: 4,886,873

[45] Date of Patent: Dec. 12, 1989

[54] AROMATIC HETERO RING-CONTAINING POLYIMIDE AND ITS COMPOSITE

[75] Inventors: Seiichi Mukai, Kunitachi; Masatoshi Kimura; Shohachi Morita, both of Yokohama, all of Japan

[73] Assignee: Director-General of Agency of Industrial Science and Technology, Tokyo, Japan

[21] Appl. No.: 164,899

[22] Filed: Mar. 7, 1988

[30] Foreign Application Priority Data

Apr. 14, 1987 [JP] Japan .................................. 62-89758
Apr. 14, 1987 [JP] Japan .................................. 62-89761

[51] Int. Cl.$^4$ ............................................. C08G 69/26
[52] U.S. Cl. ..................................... 528/353; 528/125; 528/126; 528/170; 528/172; 528/185; 528/351; 528/352
[58] Field of Search ............... 528/353, 352, 351, 170, 528/172, 185, 125, 126

[56] References Cited

U.S. PATENT DOCUMENTS 4,251,418 2/1981 Chow et al. ......................... 528/353

FOREIGN PATENT DOCUMENTS 2903465 12/1965 Japan .................................... 528/353

Primary Examiner—John Kight
Assistant Examiner—M. L. Moore
Attorney, Agent, or Firm—Oblon, Spivak, McClelland, Maier & Neustadt

[57] ABSTRACT

An aromatic hetero ring-containing polyimide comprising substantially equal equivalent amount of (1) structural units of Group 1 and (2) structural units of Group 2, wherein the structural units of Group 1 comprise (i) from 30 to 100 mol % of a unit of the formula:

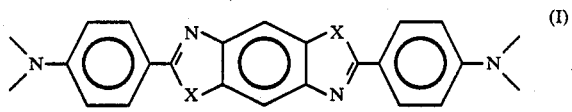

wherein X is S, O or NH, and (ii) from 0 to 70 mol % of a unit of the formula:

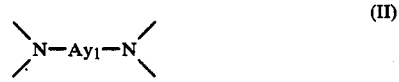

wherein $Ar_1$ is

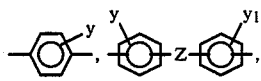

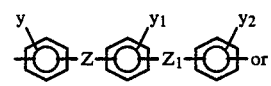

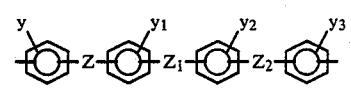

wherein each of y, $y_1$, and $y_2$ and $y_3$ is a hydrogen atom, an alkyl group, an alkoxy group or a halogen atom, and each of Z, $Z_1$ and $Z_2$ is a single bond, —O—, —CH$_2$—,

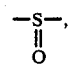

—C—, —SO$_2$—, —C(CH$_3$)$_2$— or —C(CF$_3$)$_2$, and the structural units of Group 2 comprise (i) from 70 to 100 mol % of a unit of the formula:

(Abstract continued on next page.)

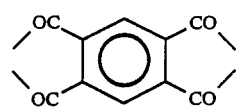 (III)
and (ii) from 0 to 30 mol % of a unit of the formula:
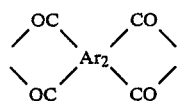 (IV)
wherein Ar$_2$ is
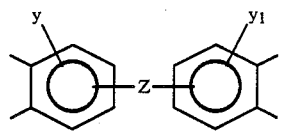
wherein Z, y and y$_1$ are as defined above, and/or a unit of the formula:
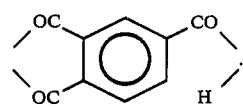 (V)
9 Claims, 1 Drawing Sheet

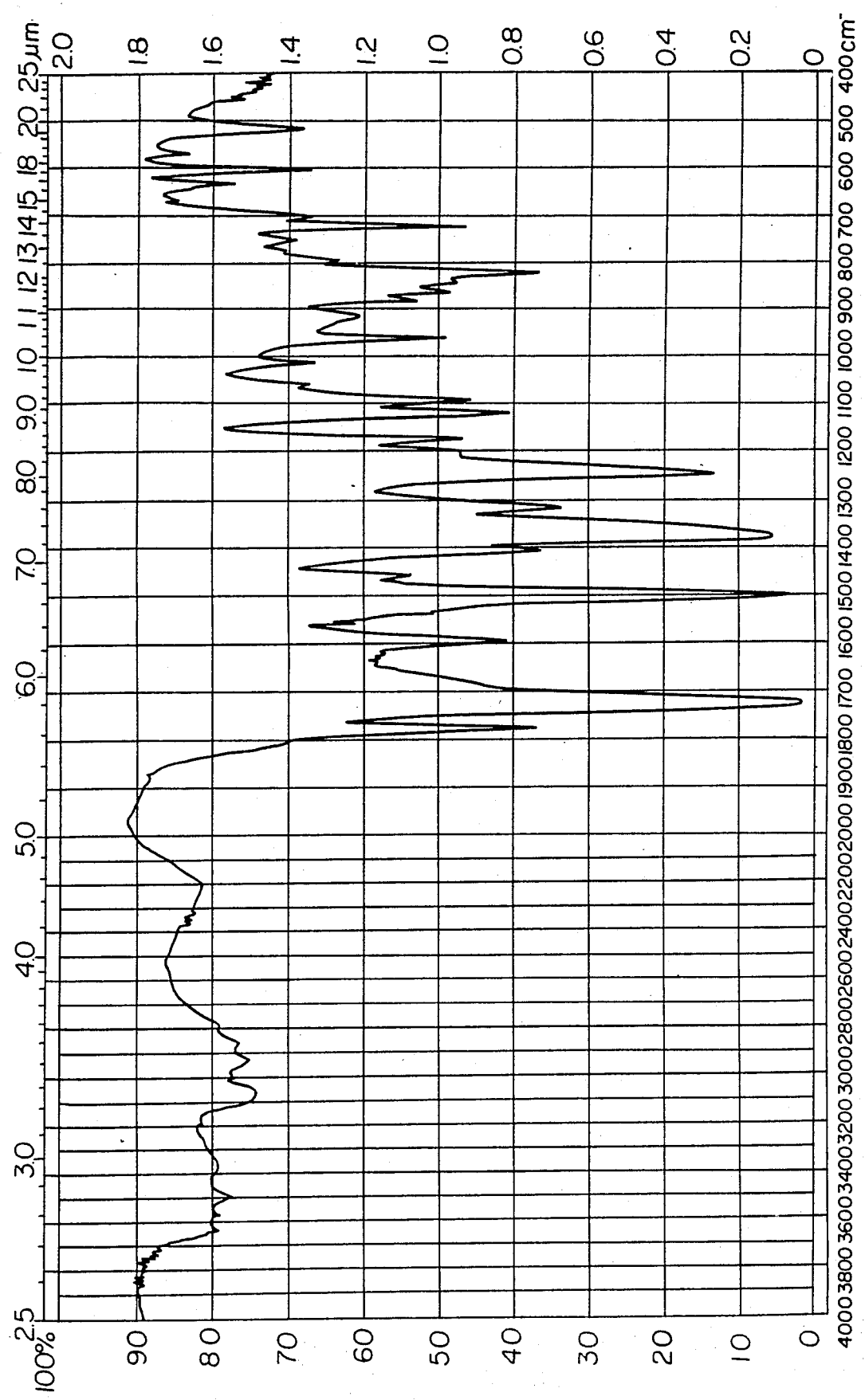

AROMATIC HETERO RING-CONTAINING POLYIMIDE AND ITS COMPOSITE

BACKGROUND OF THE INVENTION

1. FIELD OF THE INVENTION

The present invention relates to a novel aromatic hetero ring-containing polyimide having a high modulus of elasticity and excellent heat resistance, and a composite thereof. More particularly, it relates to an aromatic heterocyclic polyimide containing a benzobisazole structure in the main chain and a composite thereof.

2. DISCUSSION OF BACKGROUND

Aromatic heterocyclic polymers are expected to be prospective materials having high strength, high modulus of elasticity and high heat resistance, but they are still at a stage of research and development except for polyimides and polybenzoimidazoles. Among them, poly-p-phenylenebenzobisthiazole (PBT) known as a fiber of higher modulus of elasticity is a rigid chain polymer obtainable by reacting 2,5-diaminobenzene-1,4-dithiol dihydrochloride with terephthalic acid in polyphosphoric acid at a high temperature of from 160° to 200° C. for a long period of time, and it presents a tensile modulus of elasticity (310 GPa) as high as at least twice that of poly-p-phenyleneterephthalamide (PPTA) (Kebler ®) which is one of wholly aromatic polyamides. However, PBT is insoluble in any solvent except for a strong acid such as methanesulfonic acid or chlorosulfonic acid. Such acid solvents are highly corrosive to apparatus, and PBT is industrially disadvantageous in this respect.

On the other hand, an attention has been drawn to a development of polymer composites i.e. an attempt to disperse a rigid chain polymer and a soft polymer to each other at a molecular level to obtain a material having a high modulus of elasticity while effectively utilizing the rigidity of the rigid chain polymer. (Publication No. 50440/1980 of Japanese translation of a PCT application) However, the above-mentioned rigid chain polymer forms liquid crystals in a solution and is likely to undergo phase separation when mixed with a soft polymer. At least it is required to have an extremely dilute solution (about 3% by weight) in order to obtain a uniformly mixed solution as a prerequisite for uniform dispersion. Yet, a highly corrosive solvent is still required, and it is thereby difficult to establish a treating method which is adequatly advantageous from the industrial standpoint.

SUMMARY OF THE INVENTION

It is an object of the present invention to provide a polymer having a high modulus of elasticity and excellent heat resistance and a polymer composite having such a polymer uniformly dispersed.

It has now been found possible to accomplish such an object by using an aromatic heterocyclic polyimide containing a benzobisazole structure in its main chain. The present invention has been accomplished on the basis of this discovery.

Firstly, the present invention provides an aromatic hetero ring-containing polyimide as a rigid chain polymer containing a benzobisazole structure (which may hereinafter be referred to simply as a polymer of Group A). Secondly, the present invention provides a polymer composite comprising the rigid chain polymer (the polymer of Group A) and a soft chain polymer (which may hereinafter be referred to simply as a polymer of Group B) in a well dispersed state.

Namely, in the first aspect, the present invention provides an aromatic hetero ring-containing polyimide comprising substantially equal equivalent amounts of (1) structural units of Group 1 and (2) structural units of Group 2, wherein the structural units of Group 1 comprise (i) from 30 to 100 mol% of a unit of the formula:

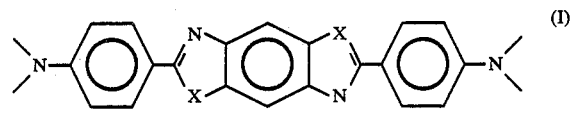

wherein X is S, O or NH, and (ii) from 0 to 70 mol% of a unit of the formula:

wherein $Ar_1$ is

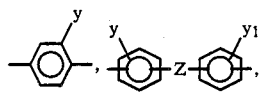

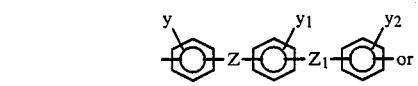

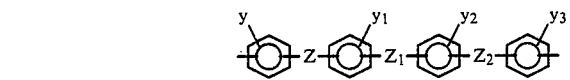

wherein each of y, $y_1$, and $y_2$ and $y_3$ is a hydrogen atom, an alkyl group, an alkoxy group or a halogen atom, and each of Z, $Z_1$ and $Z_2$ is a single bond, —O—, —CH$_2$—,

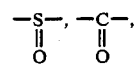

—SO$_2$—, —C(CH$_3$)$_2$— or —(CF$_3$)$_2$, and the structural units of Group 2 comprise (i) from 70 to 100 mol% of a unit of the formula:

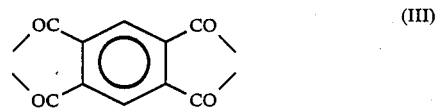

and (ii) from 0 to 30 mol% of a unit of the formula:

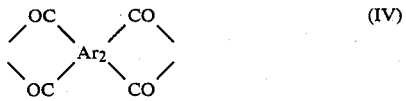

wherein $Ar_2$ is

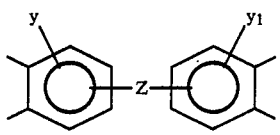

wherein Z, y and y₁ are as defined above, and/or a unit of the formula:

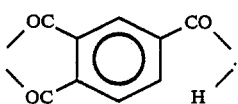     (V)

In the second aspect, the present invention provides a polymer composite comprising a polymer of Group A and a polymer of Group B, the polymer of Group A comprising substantially equal equivalent amounts of (1) structural units of Group 1 and (2) structural units of Group 2, wherein the structural units of Group 1 comprise (i) from 30 to 100 mol% of a unit of the formula:

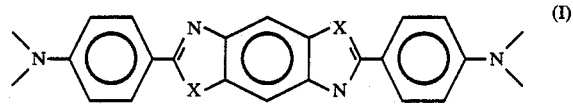     (I)

wherein X is S, O or NH, and (ii) form 0 to 70 mol% of a unit of the formula:

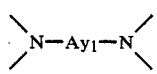     (II)

wherein Ar₁ is

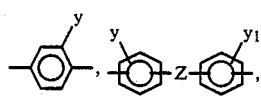

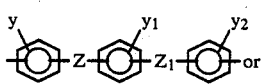

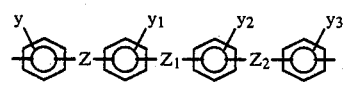

wherein each of y, y₁, and y₂ and y₃ is a hydrogen atom, an alkyl group, an alkoxy group or a halogen atom, and each of Z, Z₁ and Z₂ is a single bond, —O—, —CH₂—,

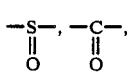

—SO₂—, —C(CH₃)₂— or —C(CF₃)₂, and the structural units of Group 2 comprise (i) from 70 to 100 mol% of a unit of the formula:

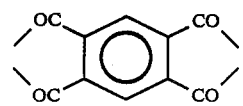     (III)

and (ii) from 0 to 30 mol% of a unit of the formula:

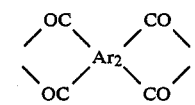     (IV)

wherein Ar₂ is

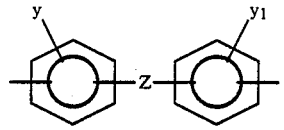

wherein Z, y and y₁ are as defined above, and/or a unit of the formula:

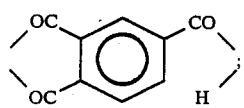     (V)

and the polymer of Group B comprising substantially equal amounts of (1') structural units of Group 1' and (2') structural units of Group 2', wherein the structural units of Group 1' comprise (i) from 0 to 50 mol% of a unit of the formula I as defined above and (ii) from 50 to 100 mol% of a unit of the formula II as defined above, and the structural units of Group 2' comprise (i) from 0 to 100 mol% of a unit of the formula III as defined above and (ii) from 0 to 100 mol% of a unit of the formula IV as defined above and/or a unit of the formula V as defined above.

BRIEF DESCRIPTION OF THE DRAWING

FIG. 1 shows an IR spectrum of the films obtained in Example 3 given hereinafter.

DETAILED DESCRIPTION OF THE PREFERRED EMBODIMENTS

The following compounds may be mentioned as monomers useful for the present invention.

An aromatic diamine which gives a unit of the formula I, may be 2,6-(4,4'-diamino-diphenyl)benzo[1,2-d:4,5-d']bisthiazole (DAPBT), 2,6-(4,4'-diamino-diphenyl)benzo[1,2-d:4,5-d']bisoxazole or 2,6-(4,4'-diamino-diphenyl)benzo[1,2-d:4,5-d']bisimidazole. An aromatic diamine which gives a unit of the formula II, may be m- or p-phenylenediamine, 2,5-diaminotoluene, 4,4'- or 3,3'-diaminodiphenyl ether, 4,4'- or 3,3'-diaminodiphenylmethane, 4,4'- or 3,3'-thiodianiline, 4,4'- or 3,3'-diaminobiphenyl, 4,4'- or 3,3'-diaminodiphenylsulfone, bis-(4-aminophenyl)isopropane, bis-(4-aminophenyl)bis(trifluoromethyl)methane, 4,4'-diaminobenzophenone, 4,4'-methylenebis(o-chloroaniline), 4,4'-methylenebis-(3-methylaniline), 4,4'-methylenebis-(2-methoxyaniline), 4,4'-methylene-bis-(2-methylaniline), 4,4'-oxybis-(2-methoxyaniline), 4,4'-oxybis-(2-chloroaniline), 4,4'-thiobis-(2-methylaniline), 4,4'-thiobis-(2-methoxyaniline), 4,4'-thiobis-(2-chloroaniline), 4,4'-sulfonylbis-(2-methylaniline), 4,4'-sulfonylbis-(2-ethoxyaniline), 4,4'-sulfonylbis-(2-chloroaniline), 3,3'-dimethyl-4,4'-diaminobenzophenone, 3,3-dimethoxy-4,4'-diaminobenzophenone, 3,3'-dichloro-4,4'-diaminobenzophenone, 3,3'-dimethylbenzidine, 3,3'-dimethoxybenzidine, 3,3'-dichlorobenzidine, 2,2'-bis[4-(4-aminophenoxy)phenyl]propane (BAPP), bis[4-(4-aminophenoxyphenyl]sulfone, 1,4-bis(4-aminophenoxy)benzene, 1,3-bis(4-aminophenoxy)benzene or 1,3-bis(3-aminophenoxy)benzene.

An aromatic tetracarboxylic dianhydride which gives a unit of the formula III may be pyromellitic anhydride. An aromatic tetracarboxylic dianhydride which gives a unit of the formula IV, may be 3,4,3',4'-benzophenonetetracarboxylic dianhydride, 3,3',4,4'-diphenyltetracarboxylic dianhydride, 2,2',3,3'-diphenyltetracarboxylic dianhydride (DPDA), 2,2'-bis(3,4-dicarboxyphenyl)propane dianhydride, bis(3,4-dicarboxyphenyl)-bis(trifluoromethyl)methane dianhydride, bis(3,4-dicarboxyphenyl)sulfone dianhydride, bis(3,4-dicarboxyphenyl)ether dianhydride or bis(3,4-dicarboxyphenyl)methane dianhydride. An aromatic tetracarboxylic acid dianhydride which gives a unit of the formula V, may be trimellitic anhydride or trimellitic anhydride chloride.

An amide solvent useful for the polymerization includes n-methyl-2-pyrrolidone (NMP), 1,3-dimethyl-2-imidazolydinone (DMI), N,N'-dimethylformamide (DMF), N,N'-dimethylacetamide (DMAc), hexamethylphosphorotriamide (HMPA) and a solvent mixture thereof.

A polyamic acid solution is obtained by reacting the above-mentioned aromatic diamine with the aromatic tetracarboxilic acid in such an amide solvent.

In the present invention, an attention has been drawn to the fact that the polyimide is obtained via a polyamic acid as its precursor. The polyamic acid useful for the present invention can be produced by reacting the aromatic diamine having a structural unit of Group 1 and the aromatic tetracarboxylic, monocarboxylic or dicarboxylic anhydride having a structural unit of Group 2 in an amide solvent. Such a polyamic acid is always softer than the finally obtainable polyimide and has excellent solubility to a polar organic solvent such as an amide solvent.

The present invention provides a polymer of Group A as a polymer having a high modulus of elasticity and excellent heat resistance, and a polymer composite comprising such a polymer of Group A and a polymer of Group B, as a composition wherein such an excellent polymer is uniformly dispersed.

For the preparation of the polymer composite, if the two polymers are compatible with each other, the respective solutions may simply be mixed so that a desired composition will be obtained. If their compatibility is not so good, it is preferred to incorporate a block copolymer having both polymer chains of Group A and polymer chains of Group B as the case requires. Such block copolymerization reaction may be conducted in accordance with a conventional method. For example, a method may be proposed wherein in a first step, a monomer capable of forming either the polymer of Group A or the polymer of Group B is polymerized to obtain a polyamic acid having an aromatic amino terminal group or an aromatic acid anhydride terminal group as a reactive site and in a second step, a monomer capable of forming the polymer of the other Group is added and the polymerization is continued.

According to the present invention, each of the polymer of Group A and the polymer composite as a combination of such a polymer with the polymer of Group B, is prepared via a polyamic acid which is soluble in a polar organic solvent to a high concentration. Accordingly, it can readily be formed into a film, a sheet or a fiber by a wet method, which is then finally imidized to obtain the desired product of the present invention.

In the case of the polymer composite, it is possible to obtain a polymer composite moldable by heat-melt molding, by the combination with a polymer of Group B having a heat meltable property. In this case, the polymer is recovered after imidazation and subjected to heat-melt molding. In the present invention, a desired effect may be obtained within a compositional weight ratio of the polymer of Group A to the polymer of Group B within in a range of A/B=1/99 to 100/0. A suitable range is determined depending upon the molding method to be used.

In the case of a wet method, it is preferred to employ a ratio within a range of from 30/70 to 100/0 in view of the film-forming or fiber-forming effeciency. Whereas, in the case of heat-melt molding, the ratio is preferably within a range of from 1/99 to 30/70.

For the ring closure of such a polyamic acid or a mixture of polyamic acids, a chemical ring-closure method or a thermal ring-closure method may be employed. However, the chemical ring-closure method is preferred, since a decrease in the polymerization degree is thereby not likely to take place.

As a chemical ring-closing agent, an acetic anhydride-pyridine system may, for example, be mentioned. The manner for using such a chemical ring-closing agent varies depending upon the molding method. In the case of a wet molding method, a method may be employed wherein a shaped product obtained by wet molding from a polyamic acid solution is dipped in a chemical ring-closing agent for ring-closure. The chemical ring-closing agent may preliminarily be added to the polyamic acid so as to prevent the ring-closing reaction to take place abruptly.

In the case of heat-melt molding, a prescribed amount of the chemical ring-closing agent may be added upon completion of the polymerization to let the ring-closure reaction proceed in the solution, and the imidized polymer is precipitated and recovered.

It is preferred to subject the molded product to after-treatment such as stretching or heat treatment to improve the modulus of elasticity.

The inherent viscosity $\eta_{inh}$ (dl/g) of a polyamic acid of the polymer of Group A is preferably from 0.5 to 20 as measured at a polymer concentration of 0.2 g/dl. If the inherent viscosity is less than 0.5, the modulus of elasticity and heat resistance of the resulting polymer tend to be inferior. On the other hand, if the inherent viscosity exceeds 20, the solubility of the resulting polmer in a solvent tends to be poor, whereby its molding tends to be difficult.

Now, the present invention will be described in further detail with reference to Examples. However, it should be understood that the present invention is by no means restricted by such specific Examples.

Polymerization of the polyamic acid was conducted at room temperature under a nitrogen stream. The inherent viscosity $\eta_{inh}$ (dl/g) of the polyamic acid was measured at 30° C. with respect to a solution diluted with NMP to a polymer concentration of 0.2 g/dl.

Further, 2,6-(4,4'-diamino-diphenyl)benzo[1,2-d:4,5-d']bisthiazole will be referred to simply as DAPBT, 4,4'-diamino-diphenyl ether as ODA, pyromellitic dianhydride as PMDA, N-methyl-2-pyrrolidone as NMP, 1,3-dimethyl-2-imidazolidinone as DMI, 2,2-bis[4-(4-aminophenoxy)phenyl]propane as BAPP, 2,2',3,3'-diphenyltetracarboxylic dianhydride as DPDA and 3,3'-dimethylbenzidine as OTD.

EXAMPLE 1

4.494 g (12 mmol) of DAPBT was added to 45 ml of NMP to obtain a slurry. To this slurry, 2.529 g (11.6 mmol) of PMDA powder was added together with 20 ml of MNP to initiate polymerization. The solution gradually became viscous and uniform. After the polymerization for 15 hours, the polyamic acid solution had an inherent viscosity $\eta_{inh}$ of 9.0 dl/g.

EXAMPLE 2

2.996 g (8 mmol) of DAPBT and 1.602 g (8 mmol) of ODA were added to 50 ml of NMP to obtain a slurry. To this slurry, 3.385 g (15.5 mmol) of PMDA was added together with 25 ml of NMP to initiate polymerization. The solution gradually became viscous and uniform. After the polymerization for 15 hours, the polyamic acid solution had an inherent viscosity $\eta_{inh}$ of 2.6 dl/g.

EXAMPLE 3

Polyimide films were formed from the polyamic acid solutions of Examples 1 and 2. Namely, each polyamic acid solution was directly cast on a glass sheet and immersed in water to remove the solvent. Then, the film was immersed in a solution of acetic anhydride/pyridine=70/30 for one day and night for chemical ring-closure, whereby the film underwent color change from yellow to reddish orange. Then, the film was dried and heat-treated at 120° C. for 10 minutes, at 200° C. for 12 minutes and at 360° C. for 4 minutes to obtain a strong film.

As shown in FIG. 1, the IR spectrum of these films showed a strong absorption at 1775 cm$^{-1}$ atrributable to an imide group.

EXAMPLE 4

A solution of a polyamic acid ($\eta_{inh}$=3.2 dl/g) obtained in the same manner as in Example 1 except that the polymerization time was changed to 7 hours, was extruded into water from a single hole nozzle having a diameter of 0.5 mm to form a fiber. The fiber was immersed in a ring-closing solution composed of acetic anhydride/pyridine/toluene (35/15/50) overnight, then washed with toluene and heat-treated at 100° C. for one hour and at 500° C. for 30 seconds. The polyimide fiber thereby obtained had a dynamic elastic modulus (as measured by "Vibron DOV II Model" manufactured by Toyo Borldwin Company) of 192 GPA at 30° C. (fiber diameter: 55 μm).

EXAMPLES 5 AND 6

The non-treated fiber obtained in Example 4 was subjected to stretch heat treatment under a predetermined load under the following heating conditions, and then the fiber diameter, the stretching ratio and the modulus of elasticity of the fiber were measured. The results are shown in Table 1.

TABLE 1

| | Load (tensile) (kg/cm$^2$) | Fiber diameter (μm) | Stretching rate (times) | Fiber elastic modulus (GPa) |
|---|---|---|---|---|
| Example 5 | 2900 | 80 | 2.0 | 220 |
| Example 6 | 1800 | 50 | 2.0 | 190 |

Heating conditions:
160° C. 10 sec.
200° C. 10 sec.
250° C. 10 sec.
350° C. 10 sec.
500° C. 10 sec.

EXAMPLE 7

5.243 g (14 mmol) of DAPBT was added to 30 ml of a solvent mixture of DMI/NMP=50/50 to obtain a slurry. To this slurry, 3.060 g (14 mmol) of PMDA powder was added together with 15 ml of the above solvent mixture to initiate polymerization. The solution gradually became viscous and uniform. After one hour from the initiation of the polymerization, it became a completely uniform reddish orange transparent solution. After the polymerization for 15 hours, the polyamic acid solution had an inherent viscosity $\eta_{inh}$ of 2.1 dl/g.

EXAMPLE 8

4.494 g (12 mmol) of DAPBT was added to 40 ml of NMP to obtain a slurry. To this slurry, 2.622 g (12 mmol) of PMDA powder was added together with 20 ml of NMP to initiate polymerization. The solution gradually became viscous and uniform. After one hour from the initiation of the polymerization, it became a completely uniform reddish orange transparent solution. After the polymerization for 15 hours, the polyamic acid solution had an inherent viscosity $\eta_{inh}$ of 3.3 dl/g.

REFERENCE EXAMPLE 1

6.369 g (30 mmol) of OTD and 6.009 g (30 mmol) of ODA were dissolved in 180 ml of NMP. To this solution, 13.114 g (60 mmol) of PMDA powder was added together with 60 ml of NMP to initiate polymerization. The solution gradually became viscous. After the polymerization for 3 hours, this polyamic acid solution had an inherent viscosity $\eta_{inh}$ of 2.1 dl/g.

EXAMPLE 9

To 43 g of the polyamic acid solution obtained in Reference Example 1, 1.2 g of acetic anhydride and 0.15 g of pyridine were added, and the mixture was stirred to subject a part of the polyamic acid to ring-closure to form an imide ring. After stirring for 2 hours, 43 g of a polyamic acid solution of Example 7 diluted with NMP to a polymer concentration of 10% by weight, was added thereto, and the mixture was further stirred for one hour to obtain a polyamic acid composite solution.

EXAMPLE 10

To 38 g of the polyamic acid solution obtained in Reference Example 1, 1.1 g of acetic anhydride and 0.13 g of pyridine were added, and the mixture was stirred to subject a part of the polyamic acid to ring-closure to form an imide ring. After stirring for 2 hours, 13 g of this solution was added to 30 g of the polyamic acid solution of Example 8, and the mixture was further stirred for one hour to obtain a polyamic acid composite solution.

EXAMPLE 11

The polyamic acid composite solutions of Examples 9 and 10 were spun, respectively, and the elastic moduli of the fibers were measured. The fibers obtained by dry/wet spinning by using water as a solidifying solvent, were immersed in a solution of acetic anhydride/pyridine=70/30 for one day and night for chemical ring-closure. After the ring-closure, the fibers were dried and heat-treated at 120° C. for 10 minutes, at 200° C. for 12 minutes and at 360° C. for 4 minutes. Further, a part of the fibers was further subjected to heat treatment at 450° C. The results are shown in Table 2.

TABLE 2

| Polymer material | Heat treating conditions Modulus of elasticity (GPa) | | |
|---|---|---|---|
| | 360° C., 4 min. | 450° C. 1 min. | 450° C., 4 min. |
| Example 9 | 13 | 31 | 36 |
| Example 10 | 70 | — | — |

REFERENCE EXAMPLE 2

6.741 g (18 mmol) of DAPBT and 8400 g (42 mmol) of ODA were dissolved in 180 ml of NMP. To this solution, 13.114 g (60 mmol) of PMDA powder was added together with 60 ml of NMP to initiate polymerization. After the polymerization for 3 hours, a viscous polyamic acid solution having an inherent viscosity $\eta_{inh}$ of 2.6 dl/g was obtained.

EXAMPLES 12 TO 15

The polyamic acid solutions of Example 8 and Reference Example 2 were mixed to obtain a polyamic acid composite solution having a predetermined molar ratio of DAPBT/ODA. To this solution, acetic anhydride and pyridine were added in amounts of 4 times and 0.3 time, respectively, by equivalent relative to the equivalent amount of the amide bonds. Then, the mixture was stirred and mixed, and then directly cast on a glass sheet to form a film. One hour later, the film was peeled off the glass sheet, then washed with toluene, attached to a metal frame, dried at 100° C. for 3 hour in air and then subjected to heat treatment at 500° C. for one minute. The results are shown in Table 3.

TABLE 3

| | DAPBT/ODA | Thickness (μm) | Modulus of elasticity* (GPa) |
|---|---|---|---|
| Example 12 | 100/0 | 25 | 11 |
| Example 13 | 79/12 | 22 | 6.0 |
| Example 14 | 65/35 | 24 | 8.3 |
| Example 15 | 51/49 | 25 | 8.2 |

*Measured in the same manner as in Example 4.

EXAMPLE 16

The polyamic complex solution used in Example 14 was subjected to casting in a similar manner to obtain a film. The film was washed with toluene, dried in air, then dried at 100° C. for 3 hours while exerting a constant load of 1500 kg/cm² and then subjected to heat treatment at 500° C. for one minute, whereby the film was stretched. The modulus of elasticity was measured in the same manner as in Example 4 and found to be 33 GPa.

REFERENCE EXAMPLE 3

4.5128 g (11 mmol) of BAPP was dissolved in 20 ml of NMP. To this solution, 3.2425 g (11 mmol) of DPDA was added together with 20 ml of NMP to initiate polymerization. After the polymerization for 3 hours, a viscous polyamic acid solution having an inherent viscosity $\eta_{inh}$ of 2.07 dl/g was obtained.

REFERENCE EXAMPLE 4

To the polyamic acid solution obtained in Reference Example 3, acetic anhydride and pyridine were added in amounts of 4 times and 0.3 time, respectively, by equivalent relative to the equivalent amount of the amide bonds, and the ring-closure reaction was conducted at room temperature for 15 hours to obtain a uniform polyimide solution. To this solution, methanol was dropwise added, and the polyimide was precipitated in a powder form. It was subjected to washing and filtration repeatedly and then dried under reduced pressure to obtain a polyimide having an inherent viscosity $\eta_{inh}$ of 1.35 dl/g.

REFERENCE EXAMPLE 5

8.4039 g (20.5 mmol) of BAPP was dissolved in 40 ml of NMP. To this solution, 4.279 g (20.3 mmol) of trimellitic anhydride chloride was added together with 40 ml of NMP to initiate polymerization. After the reaction for one hour, 4.3 ml (30.9 mmol) of triethylamine was added thereto, and the reaction was continued for further 2 hours to obtain a viscous polyamic acid solution having an inherent viscosity $\eta_{inh}$ of 2.79 dl/g.

REFERENCE EXAMPLE 6

To the polyamic acid solution obtained in Reference Example 5, acetic anhydride and pyridine were added in amounts of 4 times and 0.3 time, respectively, by equivalent relative to the equivalent amount of the amide bonds, and the ring-closure reaction was conducted at room temperature for 15 hours to obtain a uniform polyamideimide solution. To this solution, methanol was dropwise added, and the polyimide was precipitated in a powder form. Then, it was subjected to washing and filtration repeatedly and dried under reduced pressure to obtain a polyamideimide having an inherent viscosity $\eta_{inh}$ of 2.07 dl/g.

REFERENCE EXAMPLE 7

8.0923 (21.6 mmol) of DAPBT was added to 50 ml of NMP to obtain a slurry. To this slurry, 21.7 mmol of PMDA was added together with 45 ml of NMP to initiate polymerization. After the polymerization for 15 hours, a viscous polyamic acid solution having an inherent viscosity $\eta_{inh}$ of 2.50 dl/g was obtained.

REFERENCE EXAMPLE 8

To the polyamic acid solution obtained in Reference Example 7, acetic anhydride and pyridine were added in amounts of 4 times and 0.3 time, respectively, by equivalent relative to the equivalent amount of the amide bonds, and the ring-closure reaction was initiated. About 15 minutes later, the reaction system was changed from the uniform system to the precipitation system. After the reaction for 15 hours, this slurry was subjected to washing with methanol and filtration repeatedly and then dired under reduced pressure to obtain a polyimide powder which is insoluble in NMP.

EXAMPLE 17

2.4601 g (6 mmol) of BAPP was dissolved in 15 ml of NMP. To this solution, 1.7550 g (6 mmol) of DPDA' was added together with 15 ml of NMP to initiate the polymerization. After the reaction for 3 hours, a viscous polyamic acid solution having an inherent viscosity $\eta_{inh}$ of 1.14 dl/g was obtained. At this stage, 4.9434 g (13.2 mmol) of DAPBT and 2.9061 g (13.3 mmol) of PMDA were added together with 60 ml of NMP, and the mixture was reacted for 15 hours to obtain a viscous polyamic acid solution having an inherent viscosity $\eta_{inh}$ of 2.32 dl/g (0.2 g/dl).

EXAMPLE 18

To the polyamic acid solution obtained in Example 17, acetic anhydride and pyridine were added in amounts of 4 times and 0.3 time, respectively, by equivalent relative to the equivalent amount of the amide bonds, and the ring-closure reaction was initiated at room temperature. About 15 minutes later, the reaction system turned from the uniform system to a precipitation system. After the reaction for 15 hours, the slurry was subjected to washing with methanol and filtration repeatedly and dried under reduced pressure to obtain a polyimide powder.

4 g of this powder was dispersed in 200 ml of NMP and subjected to heat-extraction for one hour at 120° C., whereby 3.6 g of a substance insoluble in NMP was recovered. Thus, it was confirmed that the block copolymerization reaction was substantially conducted by the reaction in Example 17.

EXAMPLE 19

Preparation of polymer complex powder of A/B=20/80

To 55.40 g of the polyamic acid solution obtained in Example 17, 94.9 g of a 16.0 wt% polyamic acid solution obtained in Reference Example 3 was added to obtain a uniform solution mixture. To such a solution mixture, acetic anhydride and pyridine were added in amounts of 4 times and 0.3 time, respectively, by equivalent relative to the equivalent amount of the amide bonds, and the ring-closure reaction was initiated. About 20 minutes later, the reaction system turned from the uniform system to a precipitation system. The slurry was subjected to washing with methanol and filtration repeatedly and dired under reduced pressure to obtain a polyimide powder.

4 g of this powder was dispersed in 200 ml of NMP and subjected to heat-extraction for one hour at 120° C., whereby 1.4 g of a substance insoluble in NMP was recorvered. Thus, it was confirmed that the polyimide obtained was composed of the rigid chain polyimide substantially blocked with soft polyimide chains and the soft polyimide.

EXAMPLE 20

3.0765 g (7.5 mmol) of BAPP was dissolved in 15 ml of NMP. To this solution, 1.5610 g (7.4 mmol) of trimellitic anhydride chloride was added together with 15 ml of NMP to initiate polymerization. After the reaction for one hour, 1.6 ml (11.5 mmol) of triethylamine was added thereto, and the reaction was further continued for 2 hours, whereby a viscous polyamic acid solution having an inherent viscosity $\eta_{inh}$ of 1.34 dl/g was obtained.

At this stage, 5.1688 g (13.8 mmol) of DAPBT and 3.0391 g (13.9 mmol) of PMDA were added together with 60 ml of NMP to obtain a viscous polyamic acid solution having an inherent viscosity $\eta_{inh}$ of 2.38 dl/g.

EXAMPLE 21

To the polyamic acid solution obtained in Example 20, acetic anhydride and pyridine were added in amounts of 4 times and 0.3 time, respectively, by equivalent relative to the equivalent amount of the amide bonds, and the ring-closure reaction was initiated at room temperature. About 5 minutes later, the reaction system turned from the uniform system to a precipitation system. After the reaction for 15 hours, the slurry was subjected to washing with methanol and filtration repeatedly and dried under reduced pressure to obtain a polyimide powder.

4 g of this powder was dispersed in 200 ml of NMP and subjected to heat extraction for one hour at 120° C., whereby 3.8 g of a substance insoluble in NMP was recovered. Thus, it was confirmed that the block copolymerization reaction was substantially conducted by the reaction in Example 20.

EXAMPLE 22

Preparation of polymer composite powder of A/B=20/80

To 50.65 g of the polyamic acid solution obtained in Example 20, 98.9 g of a 14.2 wt% polyamic acid solution prepared in the same manner as in Reference Example 5 was added to obtain a uniform solution mixture. To such a solution mixture, acetic anhydride and pyridine were added in amounts of 4 times and 0.3 time, respectively, by equivalent relative to the equivalent amount of the amide bonds, and the ring-closure reaction was initiated. About 5 minutes later, the reaction system turned from the uniform system to a precipitation system. After the reaction for 15 hours, the slurry was subjected to washing with methanol and filtration repeatedly and dried under reduced pressure to obtain a polyimide powder.

4 g of this powder was dispersed in 200 ml of NMP, and subjected to heat-extraction for one hour at 120° C., whereby 1.3 g of a substance insoluble in NMP was recovered. Thus, it was confirmed that the polyimide thus obtained was composed of a mixture of the rigid chain polyimide substantially blocked with soft polyimide chains and the soft polyimide.

EXAMPLES 23 AND 24 AND COMPARATIVE EXAMPLES 1 AND 2

The polyimide powders obtained in Reference Examples 4 and 6 and Examples 18 and 21 were subjected to heat-pressing at 350° C. under 80 kg/cm² for 8 minutes to obtain sheets having a thickness of 200 μm. Test samples having 5 mm in width and 40 mm in length were cut out from these sheets and subjected to tensile tests, whereby the tensile moduli of elasticity were measured. (Tensile tester: IM-20 manufactured by IN-TESCO Company)

The results are shown in Table 4.

TABLE 4

|  | Material | Tensile modulus of elasticity (Gpa) |
|---|---|---|
| Comparative Example 1 | Reference Example 4 | 2.1 |

TABLE 4-continued

| | Material | Tensile modulus of elasticity (Gpa) |
|---|---|---|
| Comparative Example 2 | Reference Example 6 | 2.1 |
| Comparative Example 23 | Reference Example 18 | 3.7 |
| Comparative Example 24 | Reference Example 21 | 3.3 |

From the polymer and the polymer complex of the present invention, it is possible to obtain shaped products having a high modulus of elesticity by wet molding or melt molding.

What is claimed is:

1. An aromatic hetero ring-containing heat-resistant polyimide having a high modulus of elasticity, comprising substantially equal amounts of (1) structural units of Group 1, and (2) structural units of Group 2, wherein the structural units of Group 1 comprise (i) from 30 to 100 mol% of a unit of the formula:

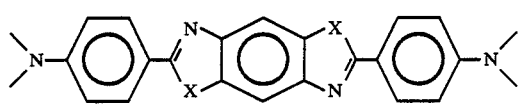
(I)

wherein X is S or O, and (ii) from 0 to 70 mol% of a unit of the formula:

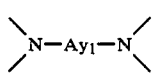
(II)

wherein $Ar_1$ is:

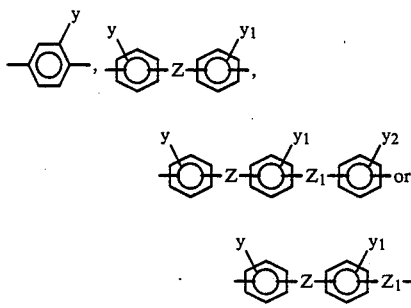

wherein each of y, $y_1$, $y_2$ and $y_3$ is a hydrogen atom, an alkyl group, an alkoxy group or a halogen atom, and each of Z, $Z_1$ and $Z_2$ is a single bond, —O—, —CH$_2$—,

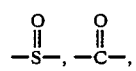

—SO$_2$—, —C(CH$_3$)$_2$— or —C(CF$_3$)$_2$, and the structural units of Group 2 comprise (i) from 70 to 100 mol% of a unit of the formula:

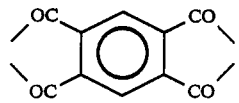
(III)

and (ii) from 0 to 30 mol% of a unit of the formula:

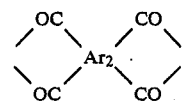
(IV)

wherein $Ar_2$ is:

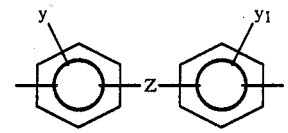

wherein Z, y and $y_1$ are as defined above, or a unit of the formula:

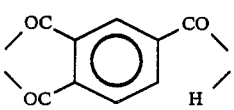
(V)

or a combination thereof.

2. The polyimide according to claim 1, which has an inherent viscosity $\eta_{inh}$ (dl/g) of the polyamic acid of from 0.5 to 20 as measured at a polymer concentration of 0.2 g/dl.

3. A polymer composite, comprising a polymer of Group A and a polymer of Group B, said polymer of Group A comprising substantially equal amounts of (1) structural units of Group 1 and (2) structural units of Group 2, wherein the structural units of Group 1 comprise (i) from 30 to 100 mol% of a unit of the formula:

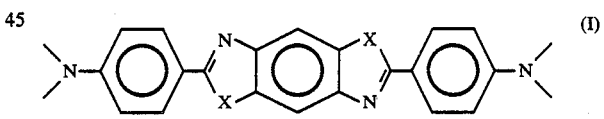
(I)

wherein X is S or O, and (ii) from 0 to 70 mol% of a unit of the formula:

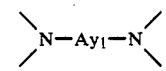
(II)

wherein $Ar_1$ is:

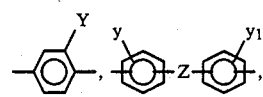
(II)

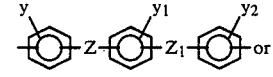

-continued

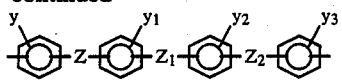

wherein each of y, y₁, y₂ and y₃ is a hydrogen atom, an alkyl group, an alkoxy group or a halogen atom, and each of Z, Z₁ and Z₂ is a single bond, —O—, —CH₂—,

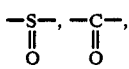

—SO₂—, —C(CH₃)₂— or —C(CF₃)₂—, and the structural units of Group 2 comprise (i) from 70 to 100 mol% of a unit of the formula:

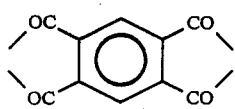
(III)

and (ii) from 0 to 30 mol% of a unit of the formula:

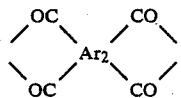
(IV)

wherein Ar₂ is:

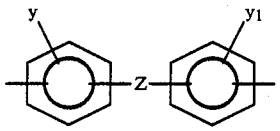

wherein Z, y and y₁ are as defined, or a unit of the formula:

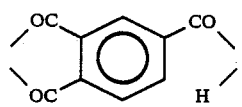
(V)

or a combination thereof, and said polymer of Group B comprising substantially equal amounts of (1') structural units of Group 1' and (2') structural units of Group 2', wherein the structural units of Group 1' comprise (i) from 0 to 50 mol% of a unit of the formula I as defined above and (ii) from 50 to 100 mol% of a unit of the formula II as defined above, and the structural units of Group 2' comprise (i) from 0 to 100 mol% of a unit of the formula III as defined above and (ii) from 0 to 100 mol% of a unit of the formula IV as defined above or a unit of the formula V as defined above or a combination thereof.

4. The polymer composite according to claim 3, wherein the polymer of Group A is substantially block-copolymerized with the polymer of Group B.

5. A polyimide according to claim 1, wherein said unit of the formula (I) is obtained from 2,6-(4,4'-diamino-diphenyl)benzo(1,2-d:4,5-d')bisthiazole, or 2,6-(4,4'-diamino-diphenyl)benzo(1,2-d:4,5-d')bisoxazole.

6. The polyimide according to claim 1, wherein said unit of the formula (II) is obtained from m- or p-phenylenediamine, 2,5-diaminotoluene, 4,4'- or 3,3'-diaminodiphenyl ether, 4,4'- or 3,3'-diaminodiphenylmethane, 4,4'- or 3,3'-thiodianiline, 4,4'- or 3,3'-diaminobiphenyl, 4,4'- or 3,3'-diaminodiphenylsulfone, bis-(4-aminophenyl)isopropane, bis-(4-aminophenyl)-bis(trifluoromethyl)methane, 4,4'-diaminobenzophenone, 4,4'-methylenebis(o-chloroaniline), 4,4'-methylenebis-(3-methylaniline), 4,4'-methylenebis-(2-methoxyaniline), 4,4'-methylenebis-(2-methylaniline), 4,4'-oxybis-(2-methoxyaniline), 4,4'-oxybis-(2-chloroaniline), 4,4'-thiobis-(2-methylaniline), 4,4'-thiobis-(2-methoxyaniline), 4,4'-thiobis-(2-chloroaniline), 4,4'-sulfonylbis-(2-methylaniline), 4,4'-sulfonylbis-(2-ethoxyaniline), 4,4'-sulfonylbis-(2-chloroaniline), 3,3'-dimethyl-4,4'-diaminobenzophenone, 3,3-dimethoxy-4,4'-diaminobenzophenone, 3,3'-dichloro-4,4'-diaminobenzophenone, 3,3'-dimethylbenzidine, 3,3'-dimethoxybenzidine, 3,3'-dichlorobenzidine, 2,2'-bis[4-(4-aminophenoxy)phenyl]-propane (BAPP), bis[4-(4-aminophenoxyphenyl]sulfone, 1,4-bis(4-aminophenoxy)benzene, 1,3-bis(4-aminophenoxy) benzene or 1,3-bis(3-aminophenoxy)benzene.

7. The polyimide according to claim 1, wherein said unit of the formula (III) is obtained from pyromellitic anhydride.

8. The polyimide according to claim 1, wherein said unit of the formula (IV) is obtained from 3,4,3',4'-benzophenonetetracarboxylic dianhydride, 3,3',4,4'-diphenyltetracarboxylic dianhydride, 2,2',3,3'-diphenyltetracarboxylic dianhydride (DPDA), 2,2'-bis(3,4-dicarboxyphenyl)propane dianhydride, bis(3,4-dicarboxyphenyl)-bis(trifluoromethyl)-methane dianhydride, bis(3,4-dicarboxyphenyl)sulfone dianhydride, bis(3,4-dicarboxyphenyl)ether dianhydride or bis(3,4-dicarboxyphenyl)methane dianhydride.

9. The polyimide according to claim 1, wherein said unit of the formula (V) is obtained from trimellitic anhydride or trimellitic anhydride chloride.

* * * * *